US012555343B2

(12) United States Patent
Xie et al.

(10) Patent No.: US 12,555,343 B2
(45) Date of Patent: Feb. 17, 2026

(54) 3D MODEL GENERATION USING MULTIMODAL GENERATIVE AI

(71) Applicant: NVIDIA Corporation, Santa Clara, CA (US)

(72) Inventors: Cheng Xie, Toronto (CA); Jonathan Lorraine, Toronto (CA); Xiaohui Zeng, Toronto (CA); James Lucas, Royston (GB); Jun Gao, Toronto (CA); Sanja Fidler, Toronto (CA)

(73) Assignee: NVIDIA Corporation, Santa Clara, CA (US)

( * ) Notice: Subject to any disclaimer, the term of this patent is extended or adjusted under 35 U.S.C. 154(b) by 144 days.

(21) Appl. No.: 18/622,045

(22) Filed: Mar. 29, 2024

(65) Prior Publication Data
US 2025/0308183 A1    Oct. 2, 2025

(51) Int. Cl.
*G06T 19/20* (2011.01)
*G06T 17/20* (2006.01)
*G06V 20/64* (2022.01)

(52) U.S. Cl.
CPC .............. *G06T 19/20* (2013.01); *G06T 17/20* (2013.01); *G06V 20/647* (2022.01); *G06T 2210/56* (2013.01); *G06T 2219/2021* (2013.01)

(58) Field of Classification Search
CPC ..... G06T 19/20; G06T 17/20; G06T 2210/56; G06T 2219/2021; G06V 20/647
See application file for complete search history.

(56) References Cited

U.S. PATENT DOCUMENTS

| | | | |
|---|---|---|---|
| 11,227,448 B2* | 1/2022 | Lebaredian | G06Q 10/101 |
| 11,361,507 B1* | 6/2022 | Iqbal | G06T 19/20 |
| 2023/0410397 A1 | 12/2023 | Wang et al. | |
| 2024/0005604 A1 | 1/2024 | Kreis et al. | |
| 2024/0153188 A1 | 5/2024 | Wang et al. | |
| 2024/0161403 A1 | 5/2024 | Lin et al. | |
| 2024/0273871 A1* | 8/2024 | Song | G06V 10/28 |

* cited by examiner

*Primary Examiner* — Xin Sheng
(74) *Attorney, Agent, or Firm* — Foley & Lardner LLP

(57) ABSTRACT

In various examples, systems and methods are disclosed relating to generating an output 3D latent representation by encoding, using a text encoder, a text prompt and encoding, using a 2D/3D encoder, a 2D image of an object or a 3D representation of the object. A 3D output is generated by applying the output 3D latent representation to a decoder. A reconstruction loss and a SDS loss are determined for the 3D output. At least one of the text encoder, the 2D/3D encoder, and the decoder is updated using the reconstruction loss and the SDS loss.

20 Claims, 8 Drawing Sheets

600

RECEIVE AT LEAST ONE OF FIRST TEXT PROMPT, FIRST 2D IMAGE, OR FIRST INPUT 3D REPRESENTATION OF FIRST OBJECT
B602

GENERATE, USING MACHINE LEARNING MODEL INCLUDING TEXT ENCODER, 2D/3D ENCODER, DECODER, FIRST 3D OUTPUT CORRESPONDING TO AT LEAST ONE OF FIRST TEXT PROMPT, FIRST 2D IMAGE, OR FIRST INPUT 3D REPRESENTATION
B604

3D MODEL GENERATION USING MULTIMODAL GENERATIVE AI

BACKGROUND

Conventional generative models cannot generate diverse three-dimensional (3D) objects given that such models are trained on 3D object datasets which contain only a small number of training examples.

SUMMARY

Approaches in accordance with various embodiments relate to a scalable 3D foundation model such as a 3D generative model trained to generate high resolution and diverse 3D objects. For example, a 3D generative model such as a Variational Auto-Encoder (VAE) can be trained using a collection of annotated object data to generate a diverse universe of 3D objects or shapes such as characters, animals, toys, and other objects in the physical world. The generative model can be trained on text input to improve text-to-shape results. The generative model is multimodal in that it can generate different 3D objects applying the same text input. The generative model has improved compositionality-when compared to conventional approaches-such that by adding and subtracting text from the text input, the resulting 3D objects are different and can therefore be edited. The 3D generative model can be trained using large 3D datasets to improve diversity of the output 3D objects. In addition, 2D priors can be distilled into the 3D generative model. The generative model described herein can improve the generalization, diversity, and realism of the 3D objects using Score Distillation Sampling (SDS) loss. The generative model can also generate the material and physical properties of the 3D objects. For diverse shape generation, 2D SDS loss can be used to generalize text prompts. After determining the latent space using the VAE, a diffusion model can be trained on the latent space to develop a generative model for 3D shapes.

At least one aspect relates to a processor. The processor can include one or more circuits to generate an output 3D latent (e.g., triplane) representation by encoding, using a text encoder, a text prompt and encoding, using a 2D/3D encoder, a 2D image of an object or a 3D representation of the object. The one or more circuits can generate a 3D output by applying the output 3D latent representation to a decoder, determine a reconstruction loss and a SDS loss for the 3D output, and update at least one of the text encoder, the 2D/3D encoder, and the decoder using the reconstruction loss and the SDS loss.

At least one aspect relates to a processor. The processor can include one or more circuits to receive a first text prompt and generate, using a machine learning model including a text encoder, a 2D/3D encoder, and a decoder, a first 3D output corresponding to the first text prompt. The machine learning model is updated by generating an output 3D latent representation. For example, the machine learning model encodes, using the text encoder, a second text prompt and encodes, using the 2D/3D encoder, a 2D image of an object or an input 3D representation of the object. The machine learning model generates a second 3D output by applying the output 3D latent representation to the decoder, determining a reconstruction loss and a SDS loss for the second 3D output, and updating at least one of the text encoder, the 2D/3D encoder, and the decoder using the reconstruction loss and the SDS loss.

Disclosed embodiments can be included in a variety of different systems such as automotive systems having control systems for an autonomous or semi-autonomous machine (e.g., an AI driver, an in-vehicle infotainment system, and so on) and/or a perception system (e.g., sensor systems and so on) for an autonomous or semi-autonomous machine, systems implemented using a robot, aerial systems, medical systems, boating systems, smart area monitoring systems, systems for performing deep learning operations, systems for performing simulation operations, systems for generating or presenting virtual reality (VR) content, augmented reality (AR) content, and/or mixed reality (MR) content, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing generative AI operations, systems implementing one or more language models—such as one or more large language models (LLMs) or one or more vision language models (VLMs), systems for hosting real-time streaming applications, systems for performing light transport simulation, systems for performing collaborative content creation for 3D assets, systems implemented at least partially using cloud computing resources, and/or other types of systems.

BRIEF DESCRIPTION OF THE DRAWINGS

The present systems and methods for generating responses from image/video data for image/video-based AI systems and applications are described in detail below with reference to the attached drawing figures, wherein:

FIG. 6 is a block diagram of an example of a deployment method for a machine learning model to output 2D or 3D shapes.

DETAILED DESCRIPTION

Figure 1:
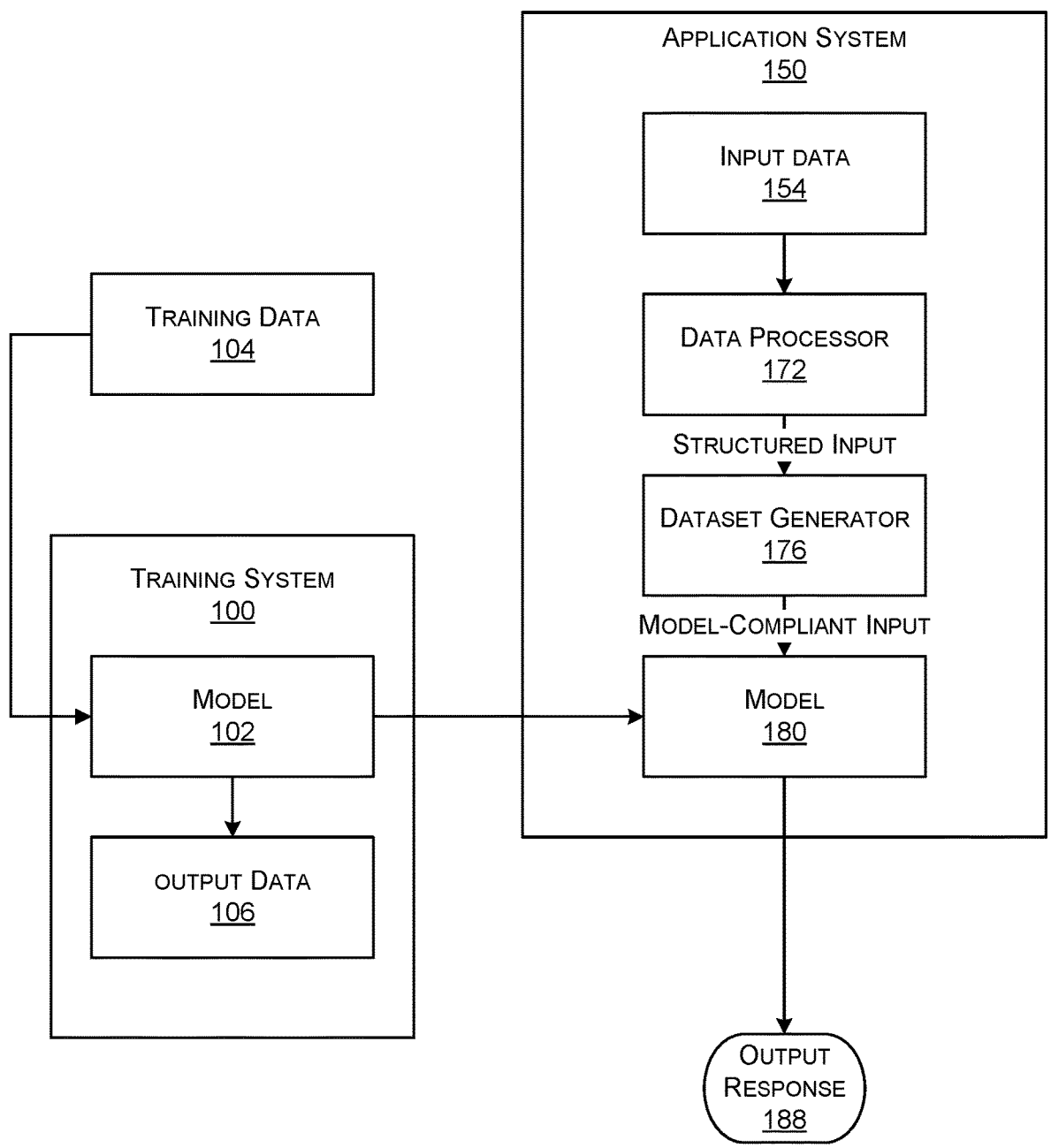
FIG. 1 illustrates an example computing environment including a training system for training (e.g., updating) machine learning models and an application system for deploying machine learning models.

In some embodiments, the generative model is implemented as or includes a VAE having multiple encoders corresponding to different training data types and a decoder. A point encoder or a 3D encoder can encode a collection of object data, point cloud data, colored point cloud data, occupancy data, a Signed Distance Fields (SDF) grid, 3D voxels (and so on) of an object to generate a 3D latent representation, such as a triplane representation. A 2D encoder can encode a 2D image or frame of an object (e.g., multi-view image, normal image, depth and RGB image, and so on) to generate a 3D representation (e.g., a triplane representation). A text encoder can encode a text prompt to generate a 3D representation (e.g., a triplane representation). For example, a vector representing the text prompt can be passed through the encoder (e.g., a neural network) to generate parameters such as values (or weights). The values are then mapped to a triplane representation. The aforementioned encoders can generate output that can be mapped to the same output 3D latent triplane representation.

A decoder can apply the output 3D latent triplane representation as input, and generate a 3D field (e.g., an SDF texture field) representing an object as output. The 3D field can be rendered using techniques such as—for example and without limitation—deep marching tetrahedra (DMTet) or differential rasterization (e.g., NVdiffrast from NVIDIA Corporation) to generate various outputs, such as a colored point cloud, a depth image, a 2D image, 2D RGB and object mask image, and so on. The rendering using the 3D field can be mesh-based, surface-based, and so on. Losses such as SDS loss and reconstruction loss are determined. The decoder can be updated using the losses.

The disclosed embodiments can be included in a variety of different systems such as automotive systems having control systems for an autonomous or semi-autonomous machine (e.g., an AI driver, an in-vehicle infotainment system, and so on) and/or a perception system (e.g., sensor systems and so on) for an autonomous or semi-autonomous machine, systems implemented using a robot, aerial systems, medical systems, boating systems, smart area monitoring systems, systems for performing deep learning operations, systems for performing simulation operations, systems for generating or presenting VR content, AR content, and/or MR content, systems for performing digital twin operations, systems implemented using an edge device, systems incorporating one or more VMs, systems for performing synthetic data generation operations, systems implemented at least partially in a data center, systems for performing conversational AI operations, systems for performing generative AI operations, systems implementing one or more language models-such as one or more LLMs or VLMs, systems for hosting real-time streaming applications, systems for performing light transport simulation, systems for performing collaborative content creation for 3D assets, systems implemented at least partially using cloud computing resources, and/or other types of systems.

With reference to FIG. 1, FIG. 1 illustrates an example computing environment including a training system 100 and an application system 150 for training (e.g., updating) and deploying machine learning models, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The training system 100 can train or update a model 102. An example of the model 102 includes a variational autoencoder (VAE). The model 102 can include one or more neural networks. As described in further details herein, for example, in FIGS. 2 and 4, the model 102 can include a 2D/3D encoder 220, a text encoder 230, a decoder 250, a mesh generator 260, and a renderer 270. In some examples, each of the 2D/3D encoder 220, text encoder 230, decoder 250, mesh generator 260, and renderer 270 includes a neural network. A neural network can include an input layer, an output layer, and/or one or more intermediate layers, such as hidden layers, which can each have respective nodes. Each of the 2D/3D encoder 220, text encoder 230, decoder 250, mesh generator 260, and renderer 270 can include various neural network models, including models that are effective for operating on respective ones of 2D data, 3D data, text, 3D triplanes, and so on. Each of the 2D/3D encoder 220, text encoder 230, decoder 250, mesh generator 260, and renderer 270 can include one or more convolutional neural networks (CNNs), one or more residual neural networks (ResNets), other network types, transformers, or various combinations thereof. The model 102 and the components thereof can include a generative model, which can include a statistical model that can generate new instances of data (e.g., new, artificial, synthetic data such as artificial, synthesized, or synthetic images or 3D representations and outputs described herein) using existing data (e.g., existing images, text prompts, or 3D representations). The new instances of data is referred to as output data 106.

The training system 100 can train or update the model 102 by applying as input the training data 104. The training data 104 can include one or more of the 2D input 212, the 3D input 214, and the text prompt 216, as described in further details herein. The model 102 (e.g., the generative model) is trained or updated using the training data 104 to allow the model 102 to output the output data 106.

The output data 106 can be used to evaluate whether the model 102 has been trained/updated sufficiently to satisfy a target performance metric, such as a metric indicative of accuracy of the model 102 in generating outputs. Such evaluation can be performed based on various types of loss, including the reconstruction loss, the SDS loss, and so on. A total/aggregate loss can be calculated to be the sum or a combination of one or more of the types of loss.

For example, the training system 100 can use a function—such as a loss function (e.g., the reconstruction loss, the SDS loss, or the total loss)—to evaluate a condition for determining whether the model 102 is configured (sufficiently) to meet the target performance metric. The condition can be a convergence condition, such as a condition that is satisfied responsive to factors such as an output of the function meeting the target performance metric or threshold, a number of training iterations, training of the model 102 converging, or various combinations thereof. For example, the function can be of the form of a mean error, mean squared error, or mean absolute error function.

The training system 100 can iteratively apply the training data 104 to update the model 102, evaluate the loss responsive to applying the training data 104, and/or modify (e.g., update one or more weights and biases of) the model 102, e.g., one or more of the 2D/3D encoder 220, text encoder 230, decoder 250, mesh generator 260, and renderer 270. The training system 100 can modify the model 102 by modifying at least one of a weight or a parameter of the model 102. The training system 100 can evaluate the function by comparing an output of the function to a threshold of a convergence condition, such as a minimum or minimized cost threshold, such that the model 102 is determined to be sufficiently trained (e.g., sufficiently accurate in generating outputs) responsive to the output of the function being less than the threshold. The training system 100 can output the model 102 responsive to the convergence condition being satisfied.

The application system 150 can operate or deploy a model 180 to generate responses to input data 154 (e.g., input text prompts similar to text prompt 216, 2D input similar to the 2D input 212, 3D input similar to the 3D input 214, and so on). The application system 150 can be a system to provide outputs (e.g., the output response 188) based on one or more of text prompts, 2D data, and 3D data. The application system 150 can be implemented by or communicatively coupled with the training system 100, or can be separate from the training system 100.

The model 180 can be or be received as the model 102, a portion thereof, or a representation thereof. For example, a data structure representing the model 102 can be used by the application system 150 as the model 180. The data structure can represent parameters of the trained model 102, such as weights or biases used to configure the model 180 based on the training of the model 102. In some examples, the model 180 includes one or more of the 2D/3D encoder 220, text encoder 230, decoder 250, mesh generator 260, and renderer 270.

The data processor 172 can be or include any function, operation, routine, logic, or instructions to perform functions such as processing the input data 154 to generate a structured input, such as a structured image's data structure. The data processor 172 can provide the structured input to a dataset generator 176.

The dataset generator 176 can be or include any function, operation, routine, logic, or instructions to perform functions such as generating, based at least on the structured input, an input compliant with the model 180. For example, the model 180 can be structured to receive input in a particular format, such as a particular text format, natural language formal, 2D data format, 3D data format, or file type, which may be expected to include certain types of values. The particular format can include a format that is the same or analogous to a format by which the training data 104 is applied to the model 102 to train the model 102. The dataset generator 176 can identify the particular format of the model 180, and can convert the structured input to the particular format.

The data processor 172 and the dataset generator 176 can be implemented as discrete functions or in an integrated function. For example, a single functional processing unit can receive the images/videos and can generate the input to provide to the model 180 responsive to receiving the images/videos.

The model 180 can generate an output response 188 (e.g., one or more of the decoder output 255, the output 3D representation 265, the rendered object 280, and so on) responsive to receiving the input from the dataset generator 176. The output response 188 can represent a 2D or 3D shape of an object.

Figure 2:
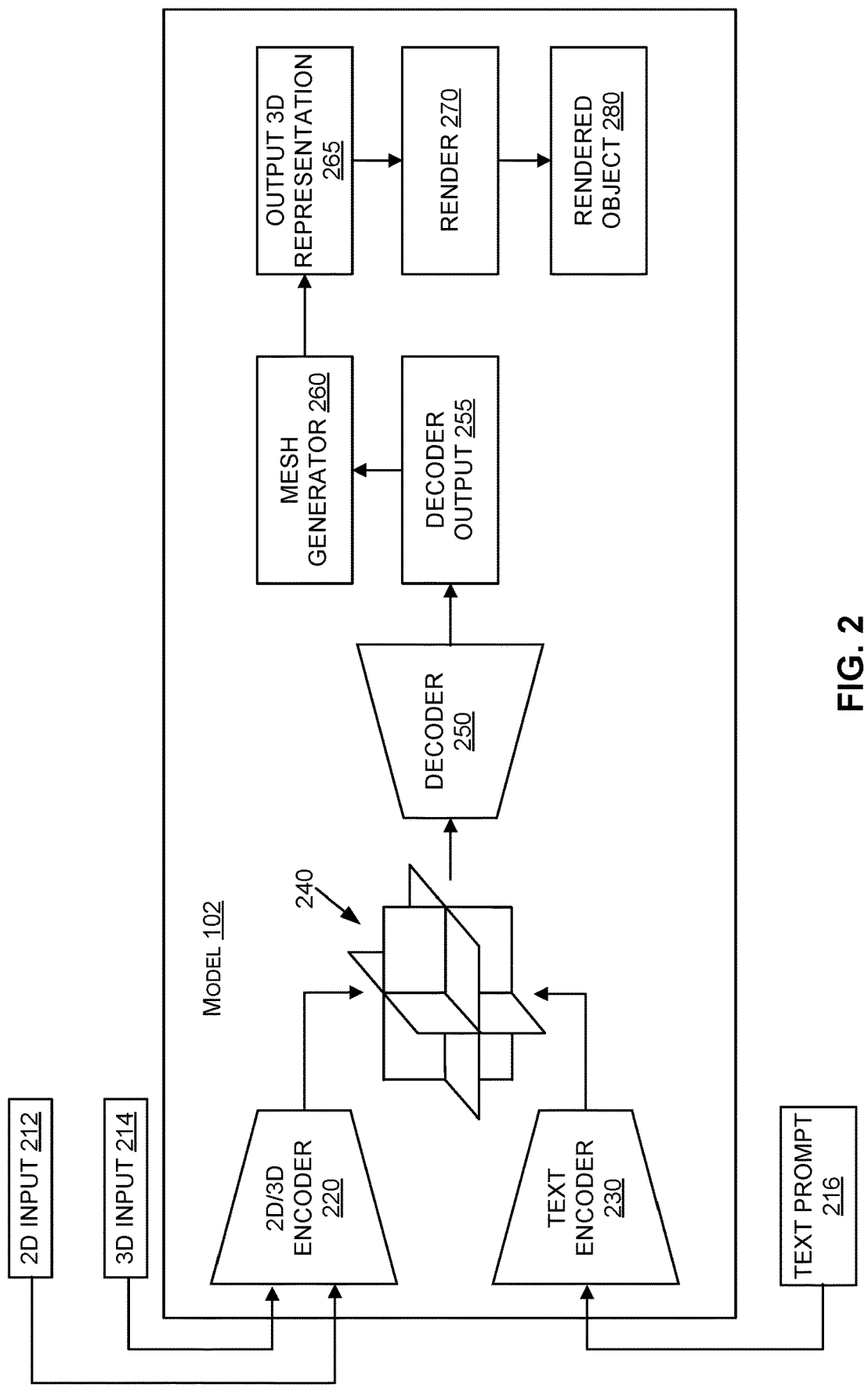
FIG. 2 is a block diagram of an example of a model shown in FIG. 1.

FIG. 2 is a block diagram of an example of the model 102, according to various embodiments. Each block shown in FIG. 2, described herein, can include one or more types of data or one or more types of computing processes that may be performed using any combination of hardware, firmware, and/or software. For instance, various functions may be carried out by a processor executing instructions stored in memory. The model 102 includes one or more of a 2D/3D encoder 220, a text encoder 230, a decoder 250, a mesh generator 260, and a renderer 270. Each block shown in FIG. 2 can also be embodied as computer-usable instructions stored on computer storage media. Each block shown in FIG. 2 can be provided by a standalone application, a service or hosted service (standalone or in combination with another hosted service), or a plug-in to another product, to name a few. In addition, each block shown in FIG. 2 is described, by way of example, with respect to the system of FIG. 1. However, these blocks can additionally or alternatively be executed by any one system, or any combination of systems, including, but not limited to, those described herein.

FIG. 2 illustrates a training pipeline that trains the model 102 (e.g., one or more of the 2D/3D encoder 220, the text encoder 230, the decoder 250, the mesh generator 260, or the renderer 270) using a training data set (e.g., the 2D inputs 212, the 3D inputs 214, and the test prompts 216) to generate 3D representations (e.g., the 255 and 265) and/or 2D representations (e.g., 280).

The 2D input 212 include input 2D representations (e.g., images) of objects. Examples of the 2D input 212 include multi-view images of objects, normal images of objects, depth images of objects, normal RGB images of objects, depth RGB images of objects, and so on.

The 3D input 214 include input 3D representations of objects. Examples of the 3D input 214 include point clouds of objects, colored point clouds of objects, occupancy fields or grids of objects, SDF functions or grids of objects, texture fields of objects, 3D fields of objects, 3D meshes of objects, 3D voxel representations of objects, and so on.

The 2D/3D encoder 220 can encode the 2D input 212 and the 2D input 214 to generate an output that is used to generate the output 3D latent triplane representation 240. In some embodiments, the 2D/3D encoder 220 includes a 2D encoder for encoding the 2D input 212, and a separate 3D encoder for encoding the 3D input 214. In some embodiments, the 2D/3D encoder 220 includes a multimodal encoder for encoding the 2D input 212 and encoding the 3D input 214.

In some embodiments, the 2D/3D encoder 220 includes an encoder for encoding each type of the 2D input 212 or the 3D input 214. For example, the 2D/3D encoder 220 includes an encoder for encoding multi-view images of objects, an encoder for encoding normal images of objects, an encoder for encoding depth images of objects, an encoder for encoding normal RGB images of objects, an encoder for encoding depth RGB images of objects, an encoder for encoding colored point clouds of objects, an encoder for encoding occupancy grids of objects, an encoder for encoding SDF grids of objects, an encoder for encoding 3D voxel representations of objects, and so on.

The text prompt 216 includes natural language inputs, user inputs, and so on. The text prompt 216 can be used to control and further refine the output (e.g., the output data 106 and/or the output response 188) of the model 102. In some examples, the output of the model 102 can be controlled or limited by the text prompt 216, e.g., the output of the model 102 is generated according to and consistent with the text prompt 216. In some examples, a single text prompt 216 can be provided as input to the text encoder 230 to generate a single output 3D representation 265. In some examples, multiple text prompts 216 can be provided as input to the text encoder 230 to generate a single output 3D representation 265. Such multiple text prompts 216 are separate and distinct, given that the multiple text prompts 216 can be generated by different users, generated at different times, obtained from different databases, separated by text separators (e.g., commas, colons, and so on), or include variations of the same general content or sentiment.

In some examples, the text encoder 230 (e.g., a first neural network thereof) can generate, extract, or otherwise determine output parameters such as one or more of embeddings (e.g., vectors, features, tensors, and so on) from a text prompt 216. The text encoder 230 (e.g., a second neural network thereof) can generate parameters of a triplane representation using the embeddings. In other words, the second neural network of the text encoder 230 can map the embeddings to the parameters of the triplane representation based on machine learning models corresponding to a mapping function. The second neural network of the text encoder 230 can be referred to as a hypernetwork or a mapping network that amortizes the text prompt 216 to a 3D representation. Examples of amortizing a text prompt to a 3D representation include U.S. patent application Ser. No. 18/137,945, titled NEURAL NETWORK-BASED DIGITAL ASSET GENERATION, filed Apr. 21, 2023, the entire content of which is incorporated herein by reference in its entirety. Examples of parameters of the triplane representation include values with respect to or at one or more points of a latent representation space (e.g., coordinates, nodes, vertices, and so on). In some examples, the triplane representation includes a value for each point a coordinate system defining the triplane. Updating the text encoder 230 in the manner described herein can include updating the biases or weights of the machine learning model for the first neural network and the second neural network of the text encoder 230.

In some examples, for a same training iteration, the text prompt 216 can be consistent with the inputs 212 and 214. For example, the text prompt 216 (e.g., "tea kettle") can describe an object or shape of the inputs 212 and 214 (e.g., an image and point cloud of a tea kettle). In other words, the text prompt 216 can be used to limit or constrain the object or shape of the inputs 212 and 214.

In some examples, for a same training iteration, the text prompt 216 can be inconsistent with the inputs 212 and 214. For example, the text prompt 216 (e.g., "car") fails to describe an object or shape of the inputs 212 and 214 (e.g., an image and point cloud of a tea kettle). In other words, the text prompt 216 may fail to limit or constrain the object or shape of the inputs 212 and 214.

The 2D/3D encoder 220 and the text encoder 230 can respectively encode the inputs 212, 214, and 215 to generate outputs, which can be used to obtain the output 3D latent triplane representation 240. Unlike other 3D representations such as a cubic representation, a triplane representation is a 3D representation defined by three planes, e.g., a X-plane, a Y-plane, and a Z-plane. A triplane representation includes points on those planes, and each point has a value. The aggregate values of the points corresponds to a latent definition of a 3D shape and can be computed by (for example and without limitation) projecting the values at each point of the three planes toward a 3D space. In other words, the triplane representation contains information about a 3D shape in the 3D space using values on three planes. The 3D latent triplane representation structure is a data structure that can efficiently meet the constraints, including those imposed by the text prompts 216, as compared to other types of latent 3D representations, given that the 3D latent triplane representation structure can represent high quality, high resolution 3D objects and shapes using low memory consumption. Examples of the triplane representation include those described in 3DGen: Triplane Latent Diffusion for Textured Mesh Generation, by Gupta et al., submitted Mar. 9, 2023, the entire content of which is incorporated herein by reference in its entirety. In some examples, instead of generating the output 3D latent triplane representation 240, 3D voxels and 3D point clouds can be likewise implemented.

In some examples, the outputs of the 2D/3D encoder 220 and the text encoder 230 can be combined, merged, or blended together to generate the output 3D latent triplane representation 240. In some embodiments, the output of the 2D/3D encoder 220 and the output of the text encoder 230 are each assigned a blending parameter (e.g., a weight) that biases the influence that the output of the 2D/3D encoder 220 and the output of the text encoder 230 have on the output 3D latent triplane representation 240. In some examples, a greater blending parameter of an output can bias the output 3D representation 265 and/or the rendered object 280 toward that output, and a lesser blending parameter of an output can bias the output 3D representation 265 and/or the rendered object 280 away from that output. In some embodiments, a blending parameter can be assigned to the output corresponding to each type of the 2D input 212 and each type of the 3D input 214 used.

In some examples, the output of the text encoder 230 includes a first 3D latent triplane representation, and the output of the 2D/3D encoder 220 includes a second 3D latent triplane representation. The output 3D latent triplane representation 240 is generated by combining the first 3D latent triplane representation and the second 3D latent triplane representation.

Figure 3:
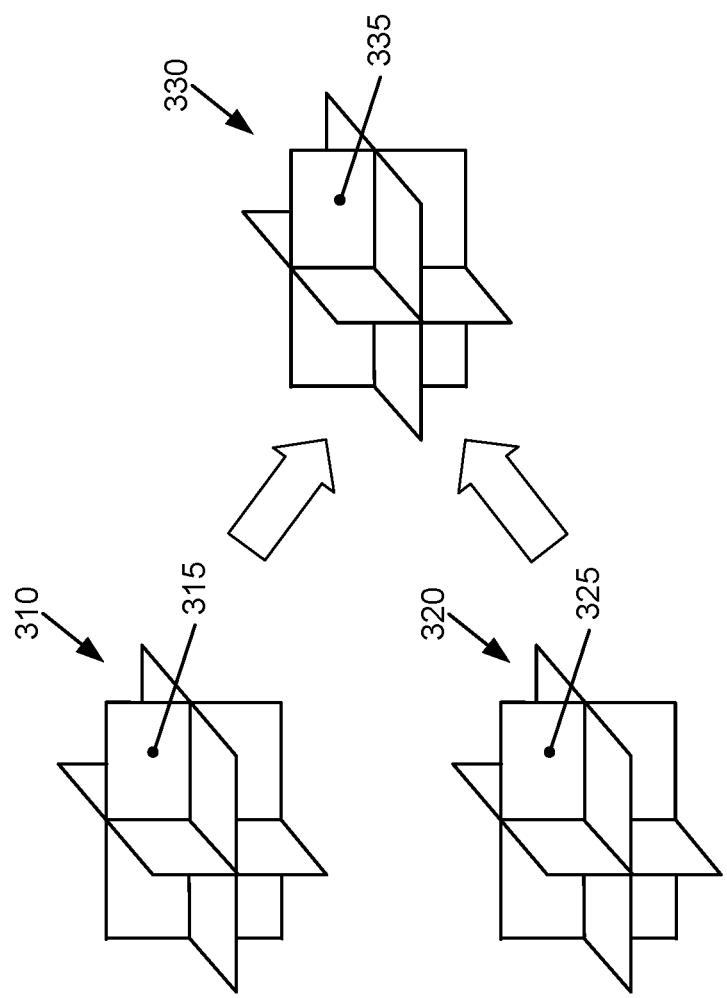
FIG. 3 is a diagram illustrating an example of combining a first 3D latent triplane representation and a second 3D latent triplane representation to generate an output 3D latent triplane representation.

FIG. 3 is a diagram illustrating an example of combining the first 3D latent triplane representation 310 and the second 3D latent triplane representation 320 to generate the output 3D latent triplane representation 330, according to various embodiments. The output 3D latent triplane representation 330 is an example of the output 3D latent triplane representation 240.

In some examples, combining the first 3D latent triplane representation 310 and the second 3D latent triplane representation 320 includes adding the value at each point (e.g., point 315) of the first 3D latent triplane representation 310 to the value at a corresponding or same point (e.g., point 325) of the second 3D latent triplane representation 320 to determine the value at the corresponding or same point (e.g., point 335) in the output 3D latent triplane representation 330. The value of each point of the first 3D latent triplane representation can be scaled or modified by a first blending parameter assigned (resulting in an adjusted value). The value of each point of the second 3D latent triplane representation can be scaled or modified by a second blending parameter assigned (resulting in another adjusted value). The adjusted values of the first and second 3D latent triplane representations can be added at each point to determine the output 3D latent triplane representation 335.

In some examples, combining the first 3D latent triplane representation and the second 3D latent triplane representation includes applying the first 3D latent triplane representation (modified with the first blending parameter) and the second 3D latent triplane representation (modified with the second blending parameter) to a neural network, which outputs the output 3D latent triplane representation 240. Such a neural network can be updated using the reconstruction loss and the SDS loss in the manner described as a part of the model 102.

The decoder 250 can generate a decoder output 255 using the output 3D latent triplane representation 240. In other words, the decoder 250 generates the decoder output 255 with the output 3D latent triplane representation 240 applied as the input to the decoder 250. In some examples, the decoder output 255 includes implicit functions, implicit values, and textures describing or which can be used to generate a 3D object or 3D shape with surfaces and textures. Examples of the decoder output 255 include an occupancy field or grid of an object, an SDF function or grid of an object, a texture field of an object, a 3D field of an object, a point cloud of an object, a colored point cloud of an object, and so on.

The mesh generator 260 can generate the output 3D representation 265 using the decoder output 255. In other words, the mesh generator 260 generates the output 3D representation 265 with the decoder output 255 applied as the input to the mesh generator 260. Examples of the output 3D representation 265 include at least one of a 3D field, a 3D mesh, or a 3D voxel of an object. For example, the mesh generator 260 can implement DMTet method to differentially extract the 3D mesh from implicit functions (e.g., the decoder output 255). Examples of the DMTet method include those described in U.S. patent application Ser. No. 17/718,172, titled "SYNTHESIZING HIGH RESOLUTION 3D SHAPES FROM LOWER RESOLUTION REPRESENTATIONS FOR SYNTHETIC DATA GENERATION SYSTEMS AND APPLICATIONS," filed Apr. 11, 2022, the entire content of which is incorporated by reference herein in its entirety. In some examples, both the decoder output 255 and the output 3D representation 265 are 3D representations of objects and can be referred to as a 3D output.

The renderer 270 performs volumetric rendering, mesh-based rendering, or surface-based rendering of the output 3D representation 265 (e.g., the mesh) to determine the rendered object 280 using the output 3D representation 265. In other words, the renderer 270 generates the rendered object 280 with the output 3D representation 265 applied as the input to the renderer 270. The rendered object 280 includes a 2D representation of an object or a shape of the object in 2D. In other words, the renderer 270 generates surfaces and textures for the output 3D representation 265, resulting in the rendered object 280. Examples of textures include color (e.g., RGB) textures, surface normals, and bump maps. The mesh-based rendering or the surface-based rendering can be implemented instead of volumetric rendering to improve the accuracy of the rendered objects 280. Examples of the rendered object 280 include a multi-view image, normal image, a depth image, an RGB image, an object mask image, and so on. In some examples, the renderer 270 can implement differential rasterization (e.g., NVdiffrast) to render the 3D mesh (e.g., the output 3D representation 265) into the rendered objection 280, using a differential method.

In some embodiments, the training system 100 can determine a reconstruction loss (referred to as the 2D reconstruction loss) between the 2D input 212 and the rendered object 280, which is a 2D data structure. In some examples, the training system 100 can determine one or more types of 2D reconstruction losses, including for example a reconstruction loss between an input multi-view image (e.g., the 2D input 212) and an output multi-view image (e.g., the rendered object 280), a reconstruction loss between an input normal image (e.g., the 2D input 212) and an output normal image (e.g., the rendered object 280), a reconstruction loss between an input depth image (e.g., the 2D input 212) and an output depth image (e.g., the rendered object 280), a reconstruction loss between an input normal RGB image (e.g., the 2D input 212) and an output normal RGB image (e.g., the rendered object 280), a reconstruction loss between an input depth RGB image (e.g., the 2D input 212) and an output depth RGB image (e.g., the rendered object 280), and so on.

In some embodiments, the training system 100 can determine a reconstruction loss (referred to as the 3D reconstruction loss) between the 3D input 214 and the output 3D representation 265 or between the 3D input 214 and the decoder output 255, where the 3D representation 265 and the decoder output 255 are 3D data structures. In some examples, the training system 100 can determine one or more types of 3D reconstruction losses, including for example reconstruction loss between an input colored point cloud (e.g., the 3D input 214) and an output colored point cloud (e.g., the decoder output 255), a reconstruction loss between an input occupancy grid (e.g., the 3D input 214) and an output occupancy grid (e.g., the decoder output 255), a reconstruction loss between an input SDF grid (e.g., the 3D input 214) and an output SDF grid (e.g., the decoder output 255), a reconstruction loss between an input 3D voxel representation (e.g., the 3D input 214) and an output 3D voxel representation (e.g., the output 3D representation 265), a reconstruction loss between an input mesh (e.g., the 3D input 214) and an output mesh (e.g., the output 3D representation 265), and so on.

In some embodiments, the SDS loss, which is referred to a text-to-3D loss or a text-to-2D, can be determined between the generated 2D/3D data and the input text such as the text prompt 216. In some embodiments, the training system 100 can determine an SDS loss (e.g., a text-to-2D SDS loss) between the text prompt 216 and the rendered object 280, which is a 2D data structure. In some examples, the training system 100 can determine one or more types of text-to-2D SDS losses, including for example an SDS loss between the text prompt 216 and an output multi-view image (e.g., the rendered object 280), an SDS loss between the text prompt 216 and an output normal image (e.g., the rendered object 280), an SDS loss between the text prompt 216 and an output depth image (e.g., the rendered object 280), an SDS loss between the text prompt 216 and an output normal RGB image (e.g., the rendered object 280), an SDS loss between the text prompt 216 and an output depth RGB image (e.g., the rendered object 280), and so on.

In some embodiments, the training system 100 can determine an SDS loss (e.g., a text-to-3D SDS loss) between the text prompt 216 and the output 3D representation 265, which is a 3D data structure. In some examples, the training system 100 can determine one or more types of text-to-3D SDS losses, including for example an SDS loss between the text prompt 216 and an output colored point cloud (e.g., the decoder output 255), an SDS loss between the text prompt 216 and an output occupancy grid (e.g., the decoder output 255), an SDS loss between the text prompt 216 and an output SDF grid (e.g., the decoder output 255), an SDS loss between the text prompt 216 and an output 3D voxel representation (e.g., the output 3D representation 265), an SDS loss between the text prompt 216 and an output mesh (e.g., the output 3D representation 265), and so on.

In a training pipeline, the training system 100 can iteratively apply the text prompt 216 to the text encoder 230 and the inputs 212 and 214 to the 2D/3D encoder 220 to update the model 102 (e.g., one or more of the 2D/3D encoder 220, the text encoder 230, the decoder 250, and so on) by evaluating the SDS loss and the reconstruction loss to modify (e.g., update one or more weights and biases of) the model 102. In some examples, the training system 100 can evaluate the function or a machine learning model of one or more of the 2D/3D encoder 220, the text encoder 230, or the decoder 250 by comparing an output of the function or the machine learning model to a threshold of a convergence condition, such as a minimum or minimized cost threshold, such that the one or more of the 2D/3D encoder 220, the text encoder 230, or the decoder 250 can determined to be sufficiently trained (e.g., sufficiently accurate in generating outputs) responsive to the output of being less than the threshold.

In some embodiments, the total reconstruction loss for an iteration of the training pipeline can include a combination of two or more different types of reconstruction losses or weighted reconstruction losses determined for different types of inputs and different types of outputs. The particular types of reconstruction losses used for one or more iterations can vary based on the available training data set (e.g., the 2D input 212 and the 3D input 214) and the generated output (e.g., the decoder output 255, the output 3D representation 265, and the rendered object 280). For example, the total reconstruction loss $L_{reconst\_total}$ used to update the model 102 can be represented using the expression below:

$$L_{reconst\_total} = \alpha_1 L_{R1} + \alpha_2 L_{R2} + \cdots + \alpha_n L_{Rn}, \quad (1)$$

where each of $L_{R1}, L^{R2}, \ldots, L_{Rn}$ is a different type of reconstruction loss (e.g., a type of 2D reconstruction losses, a type of 3D reconstruction losses, and so on), and each of $\alpha_1, \alpha_2, \ldots, \alpha_n$ is a respective weight for the corresponding type of reconstruction loss.

In some embodiments, the total SDS loss for an iteration of the training pipeline can include a combination of two or more different types of SDS losses or weighted SDS losses. The different types of SDS losses include the text-to-2D SDS loss and the text-to-3D SDS loss. For example, the total SDS loss $L_{SDS\_total}$ used to update the model 102 can be represented using the expression below:

$$L_{SDS\_total} = \beta_1 L_{S1} + \beta_2 L_{S2} + \cdots + \beta_n L_{Sn}, \quad (2)$$

where each of $L_{S1}, L_{S2}, \ldots, L_{Sn}$ is a different type of SDS loss (e.g., a type of text-to-2D SDS losses, a type of text-to-3D SDS losses, and so on), and each of $\beta_1, \beta_2, \ldots, \beta_n$ is a respective weight for the corresponding type of SDS loss.

In some embodiments, the training system 100 can update the one or more weights and biases of the model 102 to minimize a loss determined using the SDS loss and the reconstruction loss. For example, the training system 100 can update the one or more weights and biases of the model 102 (e.g., one or more of the 2D/3D encoder 220, the text encoder 230, the decoder 250, and so on) to minimize both the SDS loss and the reconstruction loss. In some examples, the training system 100 can update the one or more weights and biases of the model 102 to minimize a total loss determined by combining the SDS loss and the reconstruction loss. Combining the SDS loss and the reconstruction loss include adding the SDS loss to the reconstruction loss or adding a weighted SDS loss to a weighted reconstruction loss. For example, the total loss $L_{total}$ used to update the model 102 can be represented using the expression below:

$$L_{total} = \sigma_{reconst} L_{reconst\_total} + \sigma_{SDS} L_{SDS\_total}, \quad (3)$$

where $\sigma_{reconst}$ is the weight or blending parameter for total reconstruction loss $L_{reconst\_total}$ and $\sigma_{SDS}$ is the weight or blending parameter for total SDS loss $L_{SDS\_total}$.

Combining the SDS loss with the reconstruction loss can stabilize training of the model 102 and allow the training to become more diverse, given that the SDS loss allows 3D generation to be trained using image data sets and text prompts, which are more diverse than 3D datasets. Considering SDS loss in the text-to-3D context also allows the training of the model 102 to be more robust (prevents for example Janus face issues).

Figure 4:
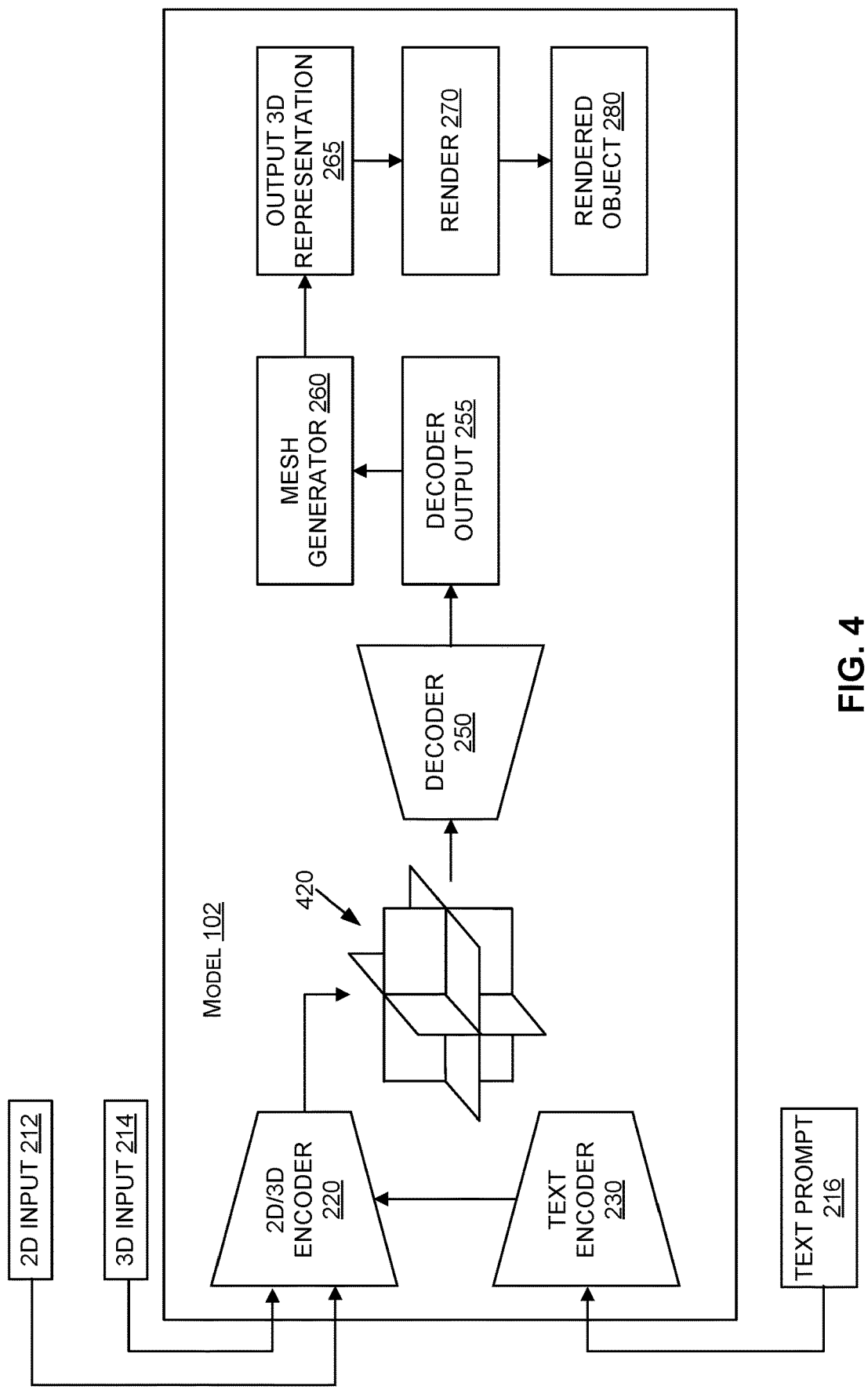
FIG. 4 is a block diagram of an example of a model shown in FIG. 1.

FIG. 4 is a block diagram of an example of the model 102, according to various embodiments. Each block shown in FIG. 4, described herein, can include one or more types of data or one or more types of computing processes that may be performed using any combination of hardware, firmware, and/or software. For instance, various functions may be carried out by a processor executing instructions stored in memory. The model 102 includes one or more of the 2D/3D encoder 220, the text encoder 230, the decoder 250, the mesh generator 260, and the renderer 270. Each block shown in FIG. 4 can also be embodied as computer-usable instructions stored on computer storage media. Each block shown in FIG. 4 can be provided by a standalone application, a service or hosted service (standalone or in combination with another hosted service), or a plug-in to another product, to name a few. In addition, each block shown in FIG. 4 is described, by way of example, with respect to the system of FIG. 1. However, these blocks can additionally or alternatively be executed by any one system, or any combination of systems, including, but not limited to, those described herein.

FIG. 4 illustrates a training pipeline that trains the model 102 (e.g., one or more of the 2D/3D encoder 220, the text encoder 230, the decoder 250, the mesh generator 260, or the renderer 270) using a training data set (e.g., the 2D inputs 212, the 3D inputs 214, and the test prompts 216) to generate 3D representations (e.g., the 255 and 265) and/or 2D representations (e.g., 280). The model 102 shown in FIG. 4 differs from the model 102 shown in FIG. 2 in that instead of combining respective 3D latent triplane representations from the 2D/3D encoder 220 and the text encoder 230 to determine the first 3D latent triplane representation 220, the text encoder 230 determines output parameters that are provided to the 2D/3D encoder 220, which generates a 3D latent triplane representation 420 based on the output parameters and at least one of the 2D input 212 or the 3D input 214.

In some examples, the text encoder 230 can generate the output parameters by encoding the text prompt 216. Examples of the output parameters include embeddings (e.g., vectors, features, tensors, and so on) extracted from the text prompt 216. The 2D/3D encoder 220 encodes at least one of the 2D input 212 or the 3D input 214 based on the output parameters to generate the output 3D latent triplane representation 420. In some examples, the output parameters can be imposed as conditions on the 2D/3D encoder 220 to generate the output 3D latent triplane representation 420. In some examples, the output parameters can be used as inputs to the 2D/3D encoder 220 to generate the output 3D latent triplane representation 420.

In some examples, a blending parameter can be applied to the output parameters to bias the output parameters in terms of the influence of the output parameters on the output 3D latent triplane representation 420. In other words, adjusted output parameters can be generated by modifying the output parameters using the blending parameter. The 2D/3D encoder 220 encodes at least one of the 2D input 212 or the 3D input 214 based on the adjusted output parameters to generate the output 3D latent triplane representation 420.

Figure 5:
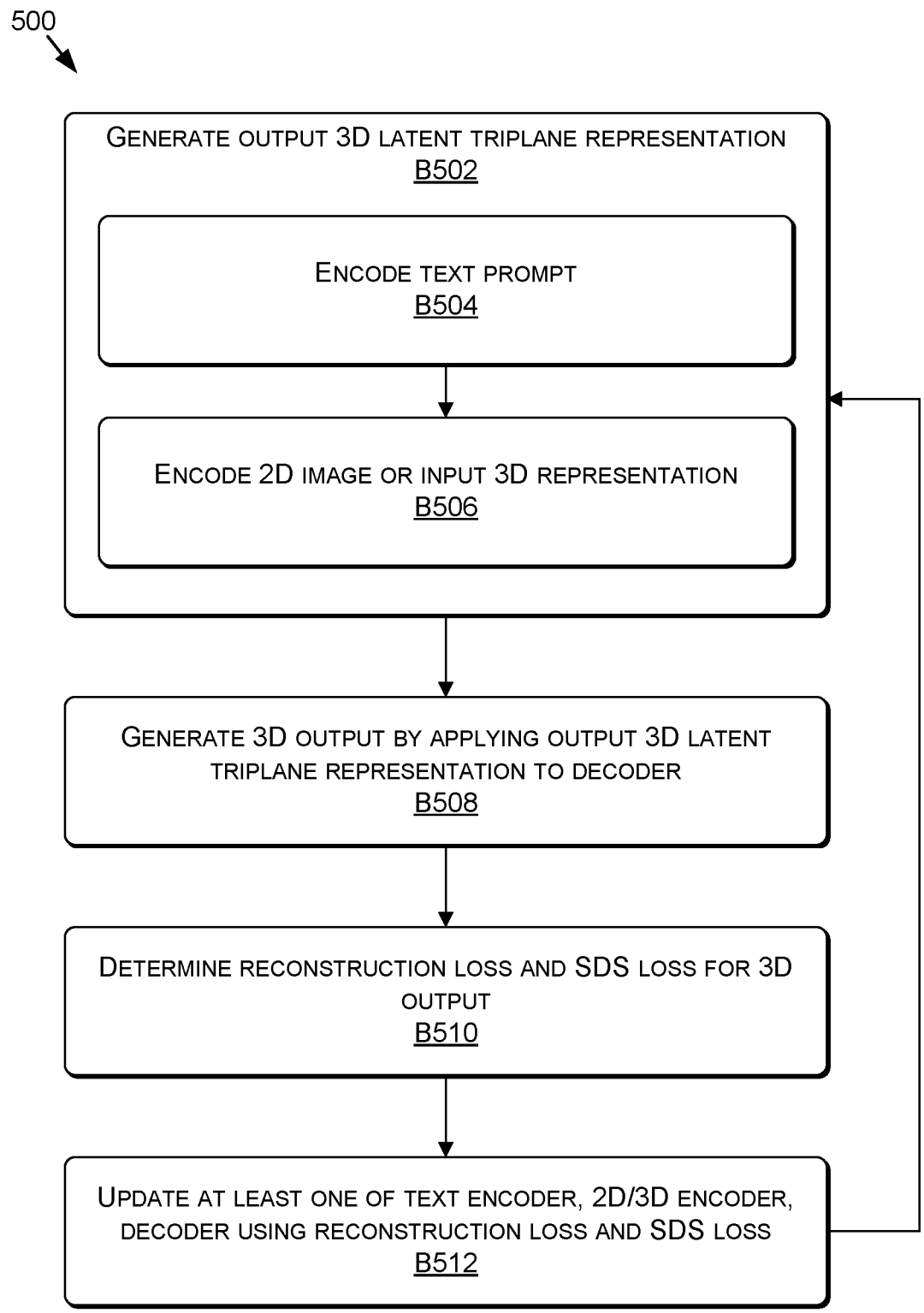
FIG. 5 is a block diagram of an example of a training method for a machine learning model to output 2D or 3D shapes.

FIG. 5 is a block diagram of an example of a training method 500 for a machine learning model (e.g., the model 102) to output 2D or 3D shapes. Each block of the method 500, described herein, can include one or more types of data or one or more types of computing processes that may be performed using any combination of hardware, firmware, and/or software. For instance, various functions may be carried out by a processor executing instructions stored in memory. The method 500 can also be embodied as computer-usable instructions stored on computer storage media. The method 500 can be provided by a standalone application, a service or hosted service (standalone or in combination with another hosted service), or a plug-in to another product, to name a few. In addition, the method 500 is described, by way of example, with respect to the system of FIG. 1 and the model 102 in FIGS. 2 and 4. However, the method 500 can additionally or alternatively be executed by any one system, or any combination of systems, including, but not limited to, those described herein.

At B502, the model 102 generates the output 3D latent triplane representation (e.g., 240 or 420. In some examples, B502 includes B504 and B506. At B504, the model 102 (e.g., the text encoder 230) encodes a text prompt (e.g., the text prompt 216). At B506, the model 102 (e.g., the 2D/3D encoder 202) encodes a 2D image (e.g., the 2D input 212) of an object or an input 3D representation (e.g., the 3D input 214) of the object.

At B508, the model 102 generates a 3D output (e.g., the decoder output 255 or the output 3D representation 265) by applying the output 3D latent triplane representation to the decoder 250. At B510, the training system 100 determines a reconstruction loss and an SDS loss for the 3D output. At B512, the training system 100 updates the model 102 (e.g., at least one of the text encoder 230, the 2D/3D encoder 220, or the decoder 250) using the reconstruction loss and the SDS loss.

In some embodiments, the text encoder 230 determines a first 3D latent triplane representation by encoding the text prompt 216. The 2D/3D encoder 220 determines a second 3D latent triplane representation by encoding the 2D image or the input 3D representation. The output 3D latent triplane representation 240 is generated by combining the first 3D latent triplane representation and the second 3D latent triplane representation. In some embodiments, combining the first 3D latent triplane representation and the second 3D latent triplane representation includes adding first value at a first point of the first 3D latent triplane representation to second value at a second point of the second 3D latent triplane representation to determine a value at a third point in the output 3D latent triplane representation, for example, as shown in FIG. 3. Both the first point and the second point correspond to or are the same as (e.g., have the same coordinates as) the third point in the output 3D latent triplane representation.

In some embodiments, combining the first 3D latent triplane representation and the second 3D latent triplane representation includes determining an adjusted first value at a first point of the first 3D latent triplane representation by modifying a first value at the first point of the first 3D latent triplane representation using a first blending parameter (the first value is an output from the text encoder 230). Combining the first 3D latent triplane representation and the second 3D latent triplane representation further includes determining an adjusted second value at a second point of the second 3D latent triplane representation by modifying a second value at the first point of the first 3D latent triplane representation using a second blending parameter (the second value is an output from the 2D/3D encoder 220). Combining the first 3D latent triplane representation and the second 3D latent triplane representation further includes adding the adjusted first value at the first point of the first 3D latent triplane representation to the adjusted second value at the second point of the second 3D latent triplane representation to determine a value at a third point in the output 3D latent triplane representation. Both the first point and the second point correspond to or are same as the third point in the output 3D latent triplane representation.

In some embodiments, the text encoder 230 generates output parameters by encoding the text prompt 216. The 2D/3D encoder 220 encodes the 2D image or the input 3D representation based on the output parameters to generate the output 3D latent triplane representation 420.

In some embodiments, the text encoder 230 generates output parameters by encoding the text prompt 216. The model 102 determines adjusted output parameters by applying a blending parameter to each of the output parameters. The 2D/3D encoder 220 encodes the 2D image or the input 3D representation based on the adjusted output parameters to generate the output 3D latent triplane representation 420.

In some examples, the input 3D representation (e.g., the 3D input 214) includes at least one of a point cloud, a colored point cloud, an occupancy grid, an SDF grid, or a 3D voxel representation. In some examples, the 2D image (e.g., the 2D input 212) includes at least one of a multi-view image, a normal image, a depth image, a normal RGB image, or a depth RGB image. In some examples, the 3D output includes an occupancy field, an SDF function, a texture field, a 3D field, a point cloud, a colored point cloud, a 3D mesh, or a 3D voxel.

In some examples, generating the 3D output includes determining the decoder output 255 by applying the 3D latent triplane representation 240 or 420 to the decoder 250 and generating an output 3D representation 265 using the decoder output 255. The 3D output includes at least one of the decoder output 255 or the output 3D representation 265.

In some examples, decoder output 255 includes at least one of implicit functions, implicit values, textures, an occupancy field, an SDF function, a texture field, a 3D field, a point cloud, a colored point cloud. In some examples, the output 3D representation 265 includes at least one of a 3D field, a 3D mesh. or a 3D voxel.

FIG. 6 is a block diagram of an example of a method 600 for deploying a machine learning model (e.g., the model 102) to output 2D or 3D shapes. Each block of the method 600, described herein, can include one or more types of data or one or more types of computing processes that may be performed using any combination of hardware, firmware, and/or software. For instance, various functions may be carried out by a processor executing instructions stored in memory. The method 600 can also be embodied as computer-usable instructions stored on computer storage media. The method 600 can be provided by a standalone application, a service or hosted service (standalone or in combination with another hosted service), or a plug-in to another product, to name a few. In addition, the method 600 is described, by way of example, with respect to the system of FIG. 1 and the model 102 in FIGS. 2 and 4, as well as the training method 500 in FIG. 5. However, the method 600 can additionally or alternatively be executed by any one system, or any combination of systems, including, but not limited to, those described herein.

At B602, the model 102 receives at least one of a first text prompt, first 2D image, or first input 3D representation of a first object. An example of the first text prompt includes the text prompt 216. An example of the first 2D image includes the 2D input 212. An example of the first 3D representation includes the 3D input 214.

The model 102 can generate one or more of the decoder output 255, the output 3D representation 265, or the rendered object 280 using the at least one of the first text prompt, first 2D image, or first input 3D representation. For example, at B604, the model 102 (including at least of the text encoder 230, the 2D/3D encoder 220, and the decoder 250) can generate first 3D output corresponding to the at least one of the first text prompt, the first 2D image, or the first input 3D representation. The machine learning model 102 is trained or updated as described with respect to the method 500.

In some examples in which the first text prompt is received at B602 (e.g., no first 2D image or the first input 3D representation is received), the text encoder 230 encodes the first text prompt to generate an output such as the 3D latent triplane representation, which is provided to the decoder 250 without being combined with any output from the 2D/3D encoder 220, to generate the decoder output 255. The output 3D representation 265 and/or the rendered object 280 can also be generated in the manner described. That is, during deployment, 2D or 3D data inputs may not be received, and one or more of the outputs 255, 265, and 280 can be generated based on a text prompt.

In some examples in which the first 2D image is received at B602 (e.g., no first text prompt or the first input 3D representation is received), the 2D/3D encoder 220 (e.g., the 2D encoder) encodes the first 2D image to generate an output such as the 3D latent triplane representation, which is provided to the decoder 250 without being combined with any other output from the 2D/3D encoder 220 or the text encoder 230, to generate the decoder output 255. The output 3D representation 265 and/or the rendered object 280 can also be generated in the manner described. That is, during deployment, text or 3D data inputs may not be received, and one or more of the outputs 255, 265, and 280 can be generated based on 2D data.

In some examples in which the first input 3D representation is received at B602 (e.g., no first text prompt or the first 2D image is received), the 2D/3D encoder 220 (e.g., the 2D encoder) encodes the first input 3D representation to generate an output such as the 3D latent triplane representation, which is provided to the decoder 250 without being combined with any other output from the 2D/3D encoder 220 or the text encoder 230, to generate the decoder output 255. The output 3D representation 265 and/or the rendered object 280 can also be generated in the manner described. That is, during deployment, text or 2D data inputs may not be received, and one or more of the outputs 255, 265, and 280 can be generated based on 3D data.

In some examples in which the first text prompt and at least one of the first 2D image or the first input 3D representation are received at B602, the text encoder 230 determines a first 3D latent triplane representation by encoding the first text prompt. The 2D/3D encoder 220 determines a second 3D latent triplane representation by encoding the at least one of the first 2D image or the first input 3D representation. The output 3D latent triplane representation is generated by combining the first 3D latent triplane representation and the second 3D latent triplane representation. In some embodiments, combining the first 3D latent triplane representation and the second 3D latent triplane representation includes adding first value at a first point of the first 3D latent triplane representation to second value at a second point of the second 3D latent triplane representation to determine a value at a third point in the output 3D latent triplane representation, for example, as shown in FIG. 3. Both the first point and the second point correspond to or are the same as (e.g., have the same coordinates as) the third point in the output 3D latent triplane representation.

In some embodiments, combining the first 3D latent triplane representation and the second 3D latent triplane representation includes determining an adjusted first value at a first point of the first 3D latent triplane representation by modifying a first value at the first point of the first 3D latent triplane representation using a first blending parameter (the first value is an output from the text encoder 230). Combining the first 3D latent triplane representation and the second 3D latent triplane representation further includes determining an adjusted second value at a second point of the second 3D latent triplane representation by modifying a second value at the first point of the first 3D latent triplane representation using a second blending parameter (the second value is an output from the 2D/3D encoder 220). Combining the first 3D latent triplane representation and the second 3D latent triplane representation further includes adding the adjusted first value at the first point of the first 3D latent triplane representation to the adjusted second value at the second point of the second 3D latent triplane representation to determine a value at a third point in the output 3D latent triplane representation. Both the first point and the second point correspond to or are same as the third point in the output 3D latent triplane representation.

In some embodiments, the text encoder 230 generates output parameters by encoding the first text prompt. The 2D/3D encoder 220 encodes the first 2D image or the first input 3D representation based on the output parameters to generate the output 3D latent triplane representation 420.

In some embodiments, the text encoder 230 generates output parameters by encoding the first text prompt. The model 102 determines adjusted output parameters by applying a blending parameter to each of the output parameters. The 2D/3D encoder 220 encodes the first 2D image or the first input 3D representation based on the adjusted output parameters to generate the output 3D latent triplane representation 420.

In some examples, the model 102 can be implemented in or the application system 150 can include one or more systems such as automotive systems having control systems for an autonomous or semi-autonomous machine (e.g., an AI driver, an in-vehicle infotainment system, and so on) and/or a perception system (e.g., sensor systems and so on) for an autonomous or semi-autonomous machine, systems implemented using a robot, aerial systems, medical systems, boating systems, smart area monitoring systems, systems for performing deep learning operations, systems for performing simulation operations, systems for generating or presenting VR content, AR content, and/or MR content, systems for performing digital twin operations, systems implemented using an edge device, systems incorporating one or more VMs, systems for performing synthetic data generation operations, systems implemented at least partially in a data center, systems for performing conversational AI operations, systems for performing generative AI operations, systems implementing one or more language models-such as one or more LLMs or VLMs, systems for hosting real-time streaming applications, systems for performing light transport simulation, systems for performing collaborative content creation for 3D assets, systems implemented at least partially using cloud computing resources, and/or other types of systems.

Example Computing Device

Figure 7:
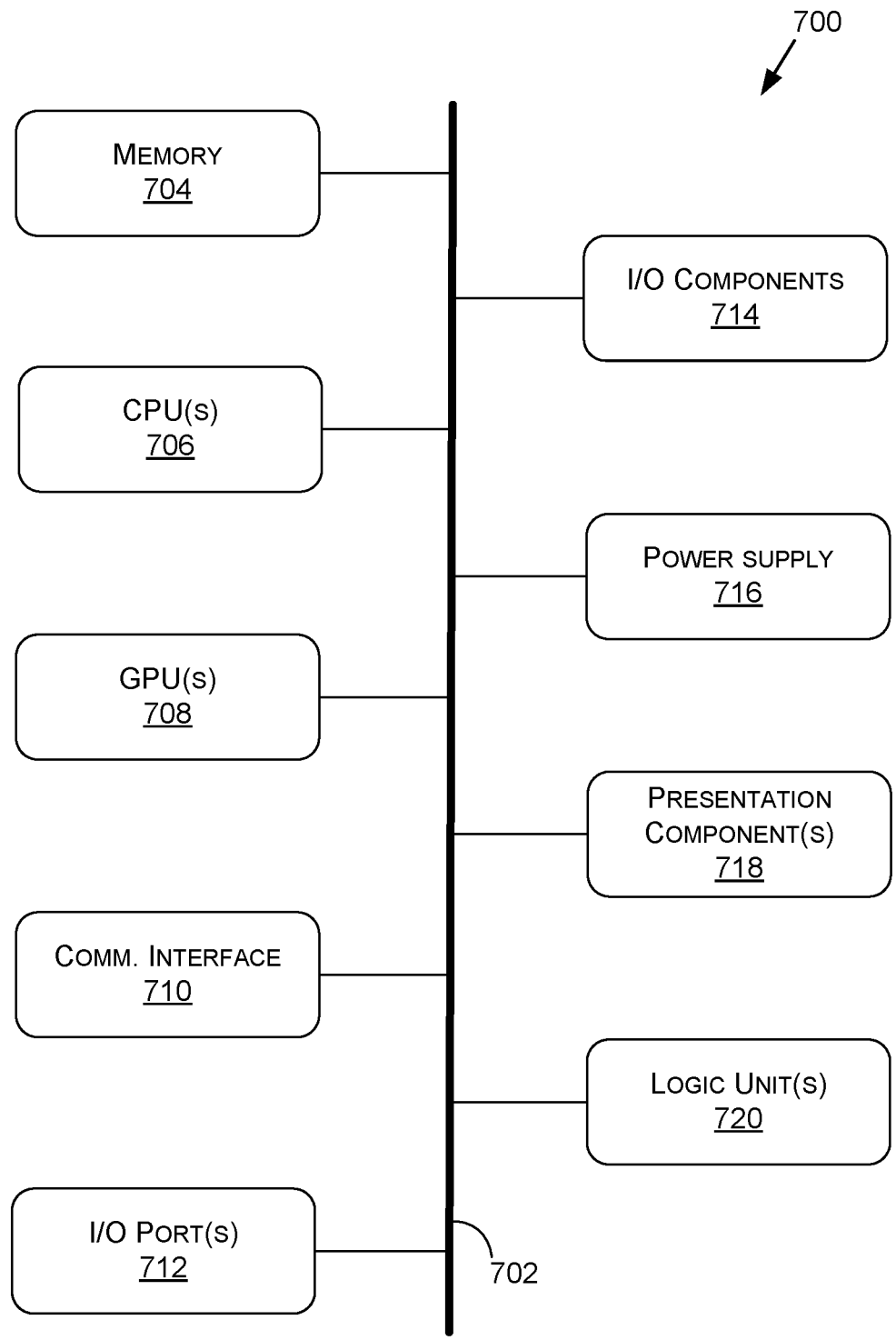
FIG. 7 is a block diagram of an example computing device.

FIG. 7 is a block diagram of an example computing device(s) 700 suitable for use in implementing some embodiments of the present disclosure. The computing device(s) 700 are example implementations of the training system 100 and/or the application system 150. Computing device 700 may include an interconnect system 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, one or more presentation components 718 (e.g., display(s)), and one or more logic units 720. In at least one embodiment, the computing device(s) 700 may comprise one or more VMs, and/or any of the components thereof may comprise virtual components (e.g., virtual hardware components). For non-limiting examples, one or more of the GPUs 708 may comprise one or more vGPUs, one or more of the CPUs 706 may comprise one or more vCPUs, and/or one or more of the logic units 720 may comprise one or more virtual logic units. As such, a computing device(s) 700 may include discrete components (e.g., a full GPU dedicated to the computing device 700), virtual components (e.g., a portion of a GPU dedicated to the computing device 700), or a combination thereof.

Although the various blocks of FIG. 7 are shown as connected via the interconnect system 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The interconnect system 702 may represent one or more links or busses, such as an address bus, a data bus, a control bus, or a combination thereof. The interconnect system 702 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 706 may be directly connected to the memory 704. Further, the CPU 706 may be directly connected to the GPU 708. Where there is direct, or point-to-point connection between components, the interconnect system 702 may include a PCIe link to carry out the connection. In these examples, a PCI bus need not be included in the computing device 700.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 706 may be configured to execute at least some of the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an Advanced RISC Machines (ARM) processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

In addition to or alternatively from the CPU(s) 706, the GPU(s) 708 may be configured to execute at least some of the computer-readable instructions to control one or more components of the computing device 700 to perform one or more of the methods and/or processes described herein. One or more of the GPU(s) 708 may be an integrated GPU (e.g., with one or more of the CPU(s) 706 and/or one or more of the GPU(s) 708 may be a discrete GPU. In embodiments, one or more of the GPU(s) 708 may be a coprocessor of one or more of the CPU(s) 706. The GPU(s) 708 may be used by the computing device 700 to render graphics (e.g., 3D graphics) or perform general purpose computations. For example, the GPU(s) 708 may be used for General-Purpose computing on GPUs (GPGPU). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data or any other suitable data, such as GPGPU data. The display memory may be included as part of the memory 704. The GPU(s) 708 may include two or more GPUs operating in parallel (e.g., via a link). The link may directly connect the GPUs (e.g., using NVLINK) or may connect the GPUs through a switch (e.g., using NVSwitch). When combined together, each GPU 708 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 706 and/or the GPU(s) 708, the logic unit(s) 720 may be configured to execute at least some of the computer-readable instructions to control one or more components of the computing device 700 to perform one or more of the methods and/or processes described herein. In embodiments, the CPU(s) 706, the GPU(s) 708, and/or the logic unit(s) 720 may discretely or jointly perform any combination of the methods, processes and/or portions thereof. One or more of the logic units 720 may be part of and/or integrated in one or more of the CPU(s) 706 and/or the GPU(s) 708 and/or one or more of the logic units 720 may be discrete components or otherwise external to the CPU(s) 706 and/or the GPU(s) 708. In embodiments, one or more of the logic units 720 may be a coprocessor of one or more of the CPU(s) 706 and/or one or more of the GPU(s) 708. Examples of the logic unit(s) 720 include the model 102, the training system 100, the data processor 172, the dataset generator 176, the model 180, the application system 150, and so on.

Examples of the logic unit(s) 720 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 720 and/or communication interface 710 may include one or more data processing units (DPUs) to transmit data received over a network and/or through interconnect system 702 directly to (e.g., a memory of) one or more GPU(s) 708.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, DPUs, etc.), and output the data (e.g., as an image, video, sound, etc.).

Example Data Center

Figure 8:
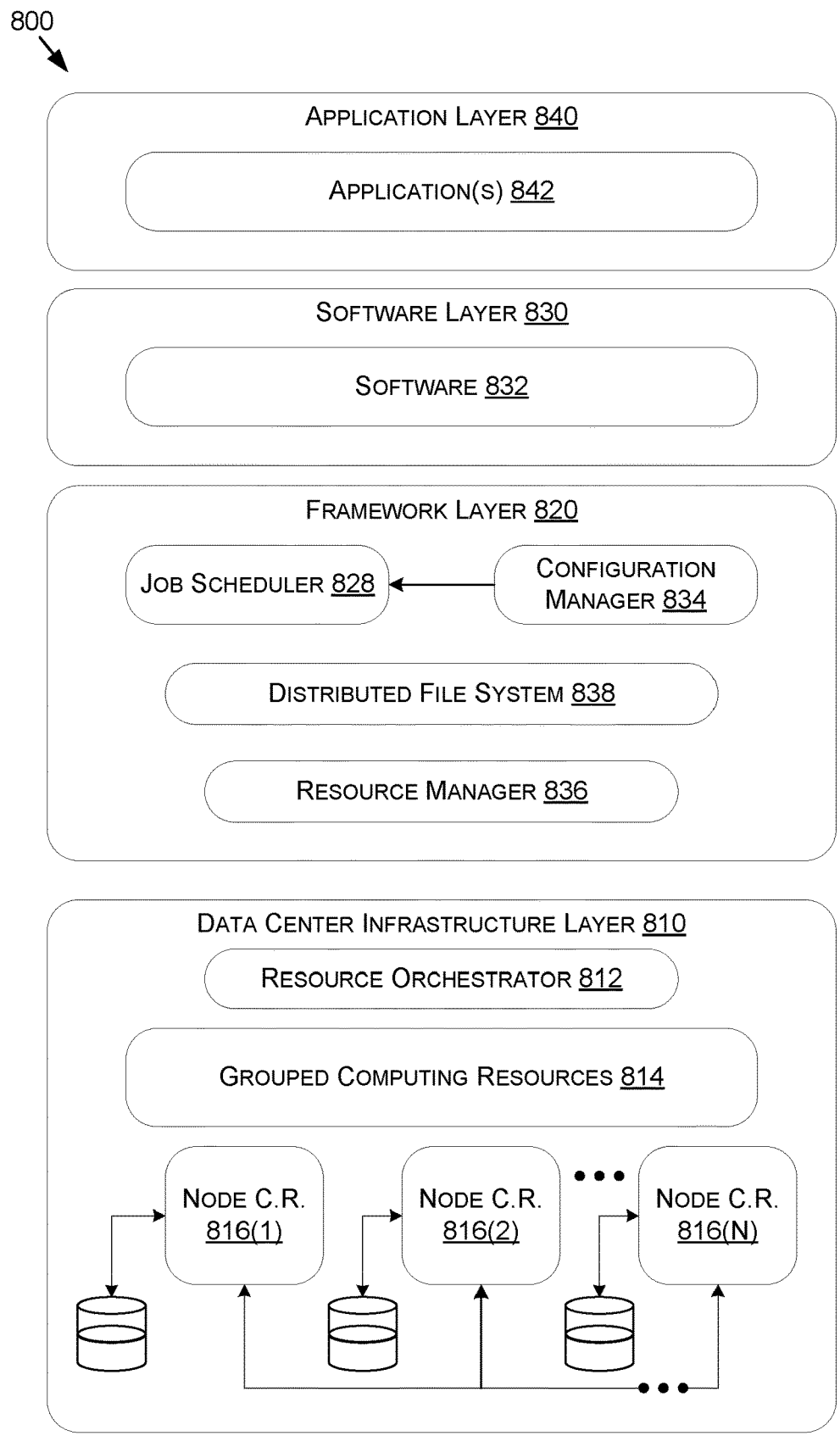
FIG. 8 illustrates an example data center.

FIG. 8 illustrates an example data center 800 that may be used in at least one embodiments of the present disclosure, such as to implement the training system 100 or the application system 150 in one or more examples of the data center 800. The data center 800 may include a data center infrastructure layer 810, a framework layer 820, a software layer 830, and/or an application layer 840.

As shown in FIG. 8, the data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units (CPUs) or other processors (including DPUs, accelerators, field programmable gate arrays (FPGAs), graphics processors or GPUs, etc.), memory devices (e.g., dynamic read-only memory), storage devices (e.g., solid state or disk drives), network input/output (NW I/O) devices, network switches, VMs, power modules, and/or cooling modules, etc. In some embodiments, one or more node C.R.s from among node C.R.s 816(1)-816(N) may correspond to a server having one or more of the above-mentioned computing resources. In addition, in some embodiments, the node C.R.s 816(1)-816(N) may include one or more virtual components, such as vGPUs, vCPUs, and/or the like, and/or one or more of the node C.R.s 816(1)-816(N) may correspond to a virtual machine (VM).

In at least one embodiment, grouped computing resources 814 may include separate groupings of node C.R.s 816 housed within one or more racks (not shown), or many racks housed in data centers at various geographical locations (also not shown). Separate groupings of node C.R.s 816 within grouped computing resources 814 may include grouped compute, network, memory or storage resources that may be configured or allocated to support one or more workloads. In at least one embodiment, several node C.R.s 816 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 812 may configure or otherwise control one or more node C.R.s 816(1)-816(N) and/or grouped computing resources 814. In at least one embodiment, resource orchestrator 812 may include a software design infrastructure (SDI) management entity for the data center 800. The resource orchestrator 812 may include hardware, software, or some combination thereof.

In at least one embodiment, as shown in FIG. 8, framework layer 820 may include a job scheduler 828, a configuration manager 834, a resource manager 836, and/or a distributed file system 838. The framework layer 820 may include a framework to support software 832 of software layer 830 and/or one or more application(s) 842 of application layer 840. The software 832 or application(s) 842 may respectively include web-based service software or applications, such as those provided by Amazon Web Services, Google Cloud and Microsoft Azure. The framework layer 820 may be, but is not limited to, a type of free and open-source software web application framework such as Apache Spark (hereinafter "Spark") that may utilize distributed file system 838 for large-scale data processing (e.g., "big data"). In at least one embodiment, job scheduler 828 may include a Spark driver to facilitate scheduling of workloads supported by various layers of data center 800. The configuration manager 834 may be capable of configuring different layers such as software layer 830 and framework layer 820 including Spark and distributed file system 838 for supporting large-scale data processing. The resource manager 836 may be capable of managing clustered or grouped computing resources mapped to or allocated for support of distributed file system 838 and job scheduler 828. In at least one embodiment, clustered or grouped computing resources may include grouped computing resource 814 at data center infrastructure layer 810. The resource manager 836 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 838 of framework layer 820. One or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 838 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments, such as to perform training of the model 102 and/or operation of the model 180.

In at least one embodiment, any of configuration manager 834, resource manager 836, and resource orchestrator 812 may implement any number and type of self-modifying actions based on any amount and type of data acquired in any technically feasible fashion. Self-modifying actions may relieve a data center operator of data center 800 from making possibly bad configuration decisions and possibly avoiding underutilized and/or poor performing portions of a data center.

The data center 800 may include tools, services, software or other resources to train one or more machine learning models (e.g., train the model 102) or predict or infer information using one or more machine learning models (e.g., the model 180) according to one or more embodiments described herein. For example, a machine learning model(s) may be trained by calculating weight parameters according to a neural network architecture using software and/or computing resources described above with respect to the data center 800. In at least one embodiment, trained or deployed machine learning models corresponding to one or more neural networks may be used to infer or predict information using resources described above with respect to the data center 800 by using weight parameters calculated through one or more training techniques, such as but not limited to those described herein.

In at least one embodiment, the data center 800 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 700 of FIG. 7—e.g., each device may include similar components, features, and/or functionality of the computing device(s) 700. In addition, where backend devices (e.g., servers, NAS, etc.) are implemented, the backend devices may be included as part of a data center 800, an example of which is described in more detail herein with respect to FIG. 8.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 500 described herein with respect to FIG. 5. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system, comprising:
one or more circuits to:
generate an output 3D latent representation by:
encoding, using a first encoder, a text prompt; and
encoding, using a second encoder, at least one of a 2D image of an object or an input 3D representation of the object;
generate a 3D output by applying the output 3D latent representation to a decoder;
determine a reconstruction loss and a sampling loss for the 3D output; and
update at least one of the first encoder, the second encoder, or the decoder using the reconstruction loss and the sampling loss.

2. The system of claim 1, wherein the one or more circuits are to:
determine a first 3D latent representation by encoding, using the first encoder, the text prompt; and
determine a second 3D latent representation by encoding, using the second encoder, the 2D image of the object or the input 3D representation of the object; and
generate the output 3D latent representation by combining the first 3D latent representation and the second 3D latent representation.

3. The system of claim 2, wherein combining the first 3D latent representation and the second 3D latent representation comprises adding a first value at a first point of the first 3D latent representation to a second value at a second point of the second 3D latent representation to determine a value at a third point in the output 3D latent representation, wherein both the first point and the second point correspond to the third point in the output 3D latent representation.

4. The system of claim 2, wherein combining the first 3D latent representation and the second 3D latent representation comprises:

determining an adjusted first value at a first point of the first 3D latent representation by modifying a first value at the first point of the first 3D latent representation using a first blending parameter, wherein the first value is an output from the first encoder;

determining an adjusted second value at a second point of the second 3D latent representation by modifying a second value at the first point of the first 3D latent representation using a second blending parameter, wherein the second value is an output from the second encoder; and adding the adjusted first value at the first point of the first 3D latent representation to the adjusted second value at the second point of the second 3D latent representation to determine a value at a third point in the output 3D latent representation, wherein both the first point and the second point correspond to the third point in the output 3D latent representation.

5. The system of claim 1, wherein
the first encoder is a text encoder that generates output parameters by encoding the text prompt; and
the second encoder is a 2D/3D encoder that encodes the 2D image of the object or the input 3D representation of the object based on the output parameters to generate the output 3D latent representation.

6. The system of claim 1, wherein
the first encoder is a text encoder that generates output parameters by encoding the text prompt;
determine adjusted output parameters by applying a blending parameter to each of the output parameters; and
the second encoder is a 2D/3D encoder that encodes the at least one of the 2D image of the object or the input 3D representation of the object based on the adjusted output parameters to generate the output 3D latent representation.

7. The system of claim 1, wherein the input 3D representation comprises at least one of a point cloud, a colored point cloud, an occupancy grid, a Signed Distance Fields (SDF) grid, or a 3D voxel representation.

8. The system of claim 1, wherein the 2D image comprises at least one of a multi-view image, a normal image, a depth image, a normal RGB image, or a depth RGB image.

9. The system of claim 1, wherein the 3D output comprises at least one of an occupancy field, a Signed Distance Fields (SDF) function, a texture field, a 3D field, a point cloud, a colored point cloud, a 3D mesh, or a 3D voxel.

10. The system of claim 1, wherein the one or more circuits generate the 3D output by:
determining a decoder output by applying the 3D latent representation to the decoder; and
generating an output 3D representation using the decoder output, the 3D output comprises at least one of the decoder output or the output 3D representation.

11. The system of claim 10, wherein
the decoder output comprises at least one of one or more implicit functions, one or more implicit values, one or more textures, an occupancy field, one or more Signed Distance Fields (SDF) function, a texture field, a 3D field, a point cloud, or a colored point cloud; and
the output 3D representation comprises at least one of a 3D field, a 3D mesh, or a 3D voxel.

12. The system of claim 1, wherein the system is comprised in at least one of:
a control system for an autonomous or semi-autonomous machine;
a perception system for an autonomous or semi-autonomous machine;
a system implemented using a robot;
an aerial system;
a medical system;
a boating system,
a smart area monitoring system;
a system for performing deep learning operations;
a system for performing simulation operations;
a system for generating or presenting virtual reality (VR) content, augmented reality (AR) content, or mixed reality (MR) content;
a system for performing digital twin operations;
a system implemented using an edge device;
a system incorporating one or more virtual machines (VMs);
a system for generating synthetic data;
a system implemented at least partially in a data center;
a system for performing conversational artificial intelligence (AI) operations;
a system for performing generative AI operations;
a system implementing one or more language models;
a system implementing one or more large language models (LLMs);
a system implementing one or more vision language models (VLMs);
a system for hosting one or more real-time streaming applications;
a system for performing light transport simulation;
a system for performing collaborative content creation for 3D assets; or
a system implemented at least partially using cloud computing resources.

13. A system, comprising:
one or more circuits to:
receive at least one of a first text prompt, a first 2D image, or a first input 3D representation of a first object; and
generate, using a machine learning model comprising a text encoder, a 2D/3D encoder, and a decoder, a first 3D output corresponding to the at least one of the first text prompt, the first 2D image, or the first input 3D representation, wherein
the machine learning model is updated by:
generating a first output 3D latent representation by:
encoding, using the text encoder, a second text prompt; and
encoding, using the 2D/3D encoder, a second 2D image of an object or a second input 3D representation of a second object;
generating a second 3D output by applying the output 3D latent representation to the decoder;
determining a reconstruction loss and a sampling loss for the second 3D output; and
updating at least one of the text encoder, the 2D/3D encoder, and the decoder using the reconstruction loss and the sampling loss.

14. The system of claim 13, wherein the one or more circuits are to:
determine a first 3D latent representation by encoding, using the text encoder, the first text prompt;
determine a second 3D latent representation by encoding, using the 2D/3D encoder, the first 2D image of the object or the first input 3D representation of the object; and generate a second output 3D latent representation by combining the first 3D latent representation and the second 3D latent representation.

15. The system of claim 14, wherein combining the first 3D latent representation and the second 3D latent representation comprises adding a first value at a first point of the first 3D latent representation to a second value at a second point of the second 3D latent representation to determine a value at a third point in the second output 3D latent representation, wherein both the first point and the second point correspond to the third point in the second output 3D latent representation.

16. The system of claim 14, wherein combining the first 3D latent representation and the second 3D latent representation comprises:
   determining an adjusted first value at a first point of the first 3D latent representation by modifying a first value at the first point of the first 3D latent representation using a first blending parameter, wherein the first value is an output from the text encoder;
   determining an adjusted second value at a second point of the second 3D latent representation by modifying a second value at the first point of the first 3D latent representation using a second blending parameter, wherein the second value is an output from the 2D/3D encoder; and
   adding the adjusted first value at the first point of the first 3D latent representation to the adjusted second value at the second point of the second 3D latent representation to determine a value at a third point in the second output 3D latent representation, wherein both the first point and the second point correspond to the third point in the second output 3D latent representation.

17. The system of claim 13, wherein
   the text encoder generates output parameters by encoding the first text prompt; and
   the 2D/3D encoder encodes the first 2D image of the object or the first input 3D representation of the object based on the output parameters to generate the second output 3D latent representation.

18. The system of claim 13, wherein
   the text encoder generates output parameters by encoding the first text prompt;
   determine adjusted output parameters by applying a blending parameter to each of the output parameters; and
   the 2D/3D encoder encodes the 2D image of the object or the input 3D representation of the object based on the adjusted output parameters to generate the second output 3D latent representation.

19. The system of claim 13, wherein the system is comprised in at least one of:
   a control system for an autonomous or semi-autonomous machine;
   a perception system for an autonomous or semi-autonomous machine;
   a system implemented using a robot;
   an aerial system;
   a medical system;
   a boating system,
   a smart area monitoring system;
   a system for performing deep learning operations;
   a system for performing simulation operations;
   a system for generating or presenting virtual reality (VR) content, augmented reality (AR) content, or mixed reality (MR) content;
   a system for performing digital twin operations;
   a system implemented using an edge device;
   a system incorporating one or more virtual machines (VMs);
   a system for generating synthetic data;
   a system implemented at least partially in a data center;
   a system for performing conversational artificial intelligence (AI) operations;
   a system for performing generative AI operations;
   a system implementing one or more language models;
   a system implementing one or more large language models (LLMs);
   a system implementing one or more vision language models (VLMs);
   a system for hosting one or more real-time streaming applications;
   a system for performing light transport simulation;
   a system for performing collaborative content creation for 3D assets; or
   a system implemented at least partially using cloud computing resources.

20. A method, comprising:
receiving at least one of a first text prompt, first 2D image, or first input 3D representation of a first object; and
generating, using a machine learning model comprising a text encoder, a 2D/3D encoder, and a decoder, a first 3D output corresponding to the at least one of the first text prompt, the first 2D image, or the first input 3D representation, wherein
the machine learning model is updated by:
   generating a first output 3D latent representation by:
      encoding, using the text encoder, a second text prompt; and
      encoding, using the 2D/3D encoder, a second 2D image of an object or a second input 3D representation of a second object;
   generating a second 3D output by applying the output 3D representation to the decoder;
   determining a reconstruction loss and a sampling loss for the second 3D output; and
   updating at least one of the text encoder, the 2D/3D encoder, and the decoder using the reconstruction loss and the sampling loss.

* * * * *